US008868083B2

United States Patent
Wallis (10) Patent No.: US 8,868,083 B2
(45) Date of Patent: Oct. 21, 2014

(54) DISCOVERING CELLULAR NETWORK ELEMENTS

(75) Inventor: Michael Brett Wallis, McKinney, TX (US)

(73) Assignee: Mavenir Systems, Inc., Richardson, TX (US)

(*) Notice: Subject to any disclaimer, the term of this patent is extended or adjusted under 35 U.S.C. 154(b) by 1696 days.

(21) Appl. No.: 12/119,633

(22) Filed: May 13, 2008

(65) Prior Publication Data

US 2008/0293433 A1 Nov. 27, 2008

Related U.S. Application Data

(60) Provisional application No. 60/939,559, filed on May 22, 2007.

(51) Int. Cl.
| | |
|---|---|
| *H04W 36/04* | (2009.01) |
| *H04W 24/02* | (2009.01) |
| *H04W 60/04* | (2009.01) |
| H04W 92/12 | (2009.01) |
| H04W 36/10 | (2009.01) |
| H04W 4/02 | (2009.01) |
| H04W 16/32 | (2009.01) |
| H04W 84/04 | (2009.01) |
| H04W 92/22 | (2009.01) |

(52) U.S. Cl.
CPC ............. *H04W 60/04* (2013.01); *H04W 92/12* (2013.01); *H04W 36/10* (2013.01); *H04W 4/02* (2013.01); *H04W 24/02* (2013.01); *H04W 16/32* (2013.01); *H04W 84/045* (2013.01); *H04W 92/22* (2013.01)
USPC ............................ 455/444; 455/449; 455/446

(58) Field of Classification Search
CPC .... H04W 84/045; H04W 88/08; H04W 92/12
USPC .......................................... 455/444, 499, 446
See application file for complete search history.

(56) References Cited

U.S. PATENT DOCUMENTS

| | | | | |
|---|---|---|---|---|
| 2003/0224804 | A1* | 12/2003 | Liu ............................ | 455/456.1 |
| 2005/0181805 | A1* | 8/2005 | Gallagher .................. | 455/456.1 |
| 2007/0105527 | A1* | 5/2007 | Nylander et al. ............. | 455/403 |

FOREIGN PATENT DOCUMENTS

WO WO 2007/015068 2/2007

OTHER PUBLICATIONS

Notification of Transmittal of the International Search Report and the Written Opinion of the International Searching Authority of Application No. PCT/US2008/063761, filed May 15, 2008 and mailed Aug. 27, 2008 (15 pages).
Shaw, Steve: "Network Integration Approaches for Femtocells", The Basestation E-Newsletter, [Online], Mar. 2007, pp. 1-7, XP002491898, http://www/openbasestation.org/Newsletters/March2007/Kineto_Femtocells.htm.

(Continued)

*Primary Examiner* — Wayne Cai
*Assistant Examiner* — Michael Irace
(74) *Attorney, Agent, or Firm* — Andrews Kurth LLP (57) ABSTRACT

The present disclosure includes a system and method for discovering network elements. In some implementations, a method includes identifying information indicating a location of a femtocell device. A communication node associated with the femtocell device is identified. A Session Initiation Protocol (SIP) message including the location information is transmitted to the identified communication node. A response is received requesting that the femtocell device register with a different communication node associated with a cellular core network at least proximate the location.

15 Claims, 7 Drawing Sheets

(56) References Cited

OTHER PUBLICATIONS

Nikas et al: "SIP as a unified signaling solution in a beyond 3G system", Computer Communications, Elsevier Science Publishers Bvd, Amsteram, NL, vol. 29, No. 16, Oct. 12, 2006, XP005668339, pp. 3226-3237.

International Preliminary Report on Patentability issued in International Application PCT/US2008/063761 filed on May 15, 2008, mailed on Aug. 19, 2009, 12 pages.

* cited by examiner

DISCOVERING CELLULAR NETWORK ELEMENTS

CLAIM OF PRIORITY

This application claims priority under 35 USC §119(e) to U.S. patent application Ser. No. 60/939,559, filed on May 22, 2007, the entire contents of which are hereby incorporated by reference.

TECHNICAL FIELD

This invention relates to telecommunications and, more particularly, to discovering mobile core network elements.

BACKGROUND

Communication networks include wired and wireless networks. Example wired networks include the Public Switched Telephone Network (PSTN) and the Internet. Example wireless networks include cellular networks as well as unlicensed wireless networks that connect to wire networks. Calls and other communications may be connected across wired and wireless networks.

Cellular networks are radio networks made up of a number of radio cells, or cells, that are each served by a base station or other fixed transceiver. The cells are used to cover different areas in order to provide radio coverage over a wide area. When a cell phone moves from place to place, it is handed off from cell to cell to maintain a connection. The handoff mechanism differs depending on the type of cellular network. Example cellular networks include Universal Mobile Telecommunications System (UMTS), Wide-band Code Division Multiple Access (WCDMA), and CDMA2000. Cellular networks communicate in a radio frequency band licensed and controlled by the government.

Unlicensed wireless networks are typically used to wirelessly connect portable computers, PDAs and other computing devices to the internet or other wired network. These wireless networks include one or more access points that may communicate with computing devices using an 802.11 and other similar technologies.

SUMMARY

The present disclosure includes a system and method for discovering network elements. In some implementations, a method includes identifying information indicating a location of a femtocell device. A communication node associated with the femtocell device is identified. A Session Initiation Protocol (SIP) message including the location information is transmitted to the identified communication node. A response is received requesting that the femtocell device register with a different communication node associated with a cellular core network at least proximate the location.

The details of one or more implementations of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
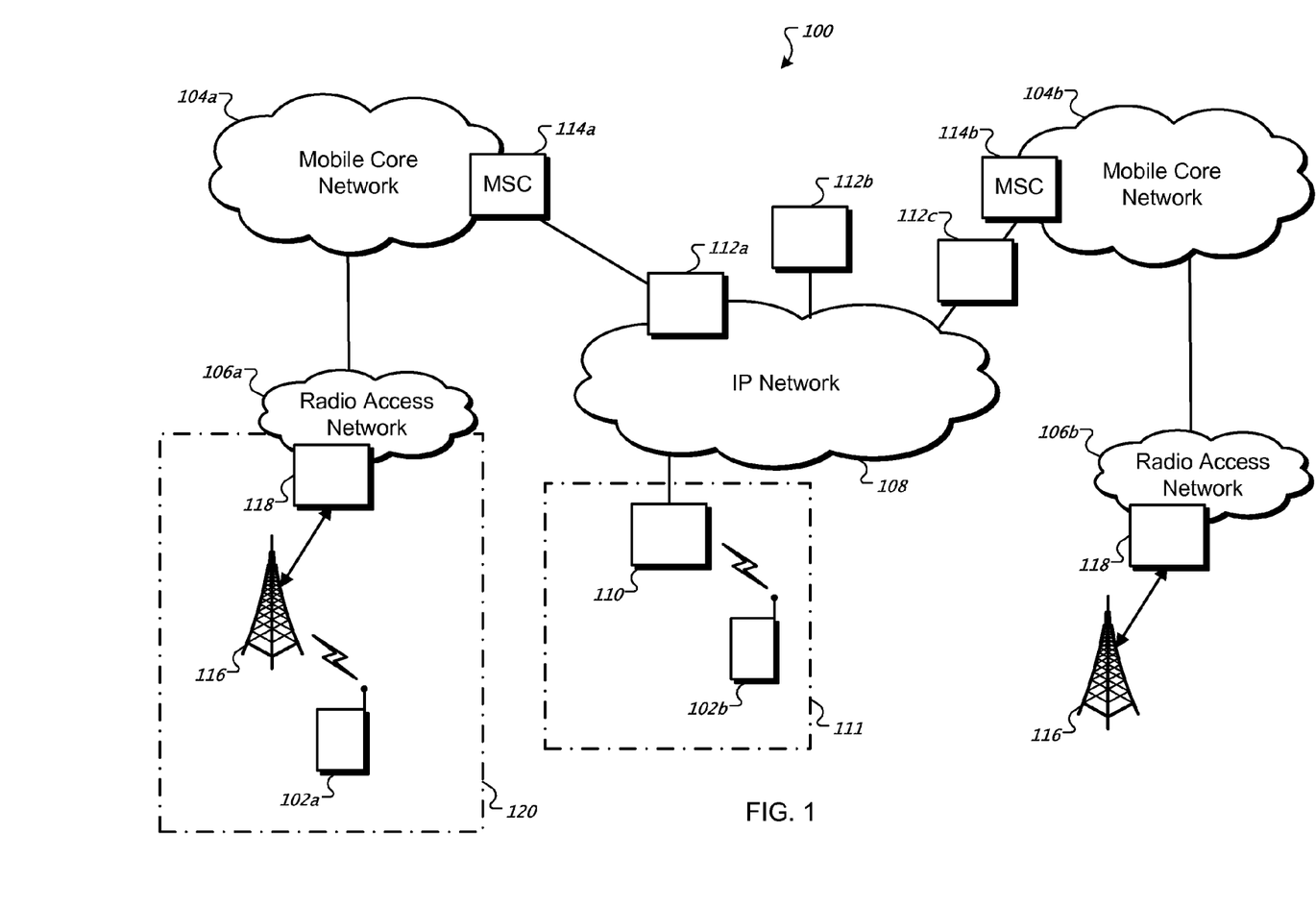
FIG. 1 is a block diagram illustrating an example system in accordance with some implementations of the present disclosure.
Figure 2A:
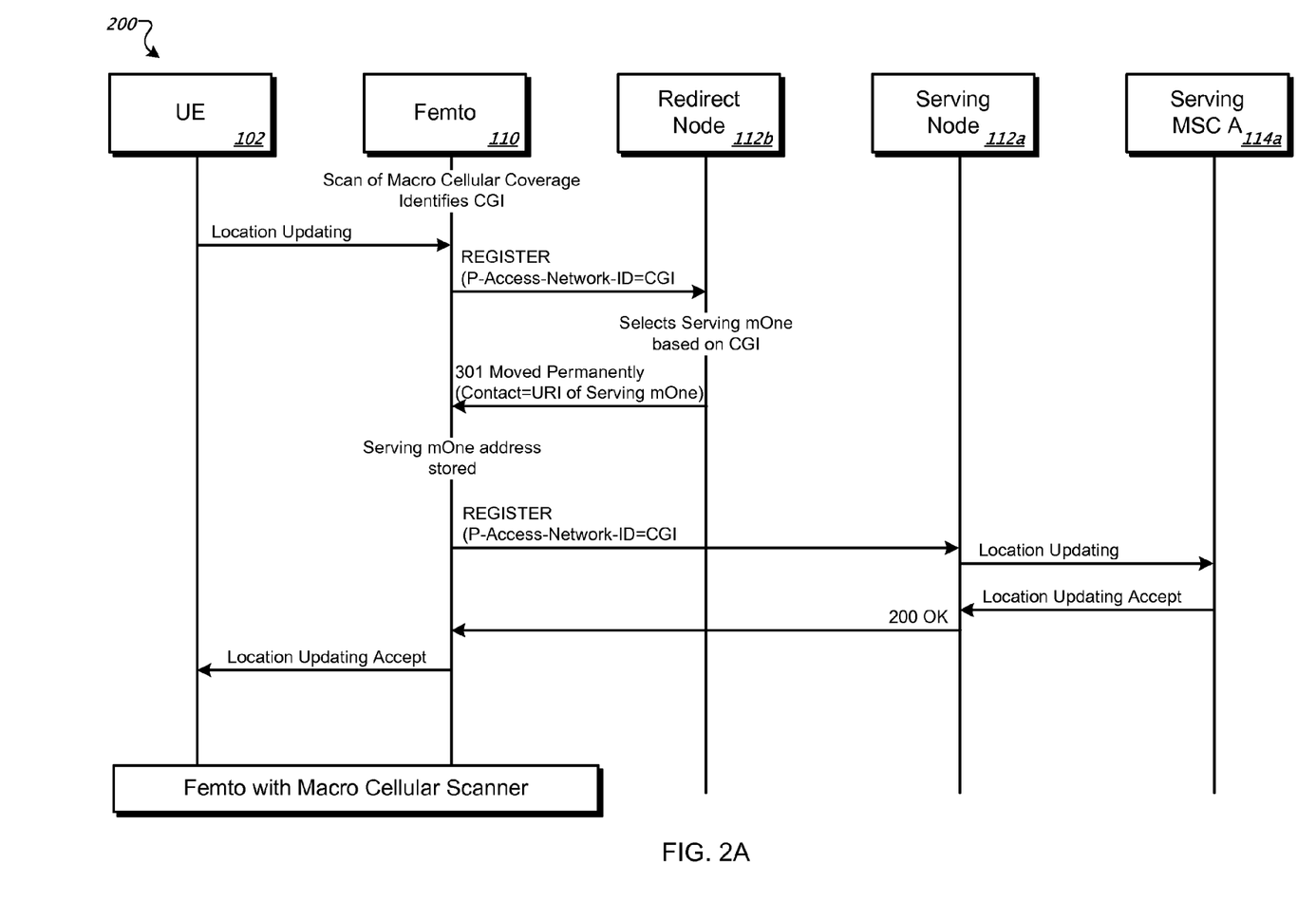
FIGS. 2A to 2E illustrate example call flows for discovering femtocell devices in the system of FIG. 1.
Figure 2B:
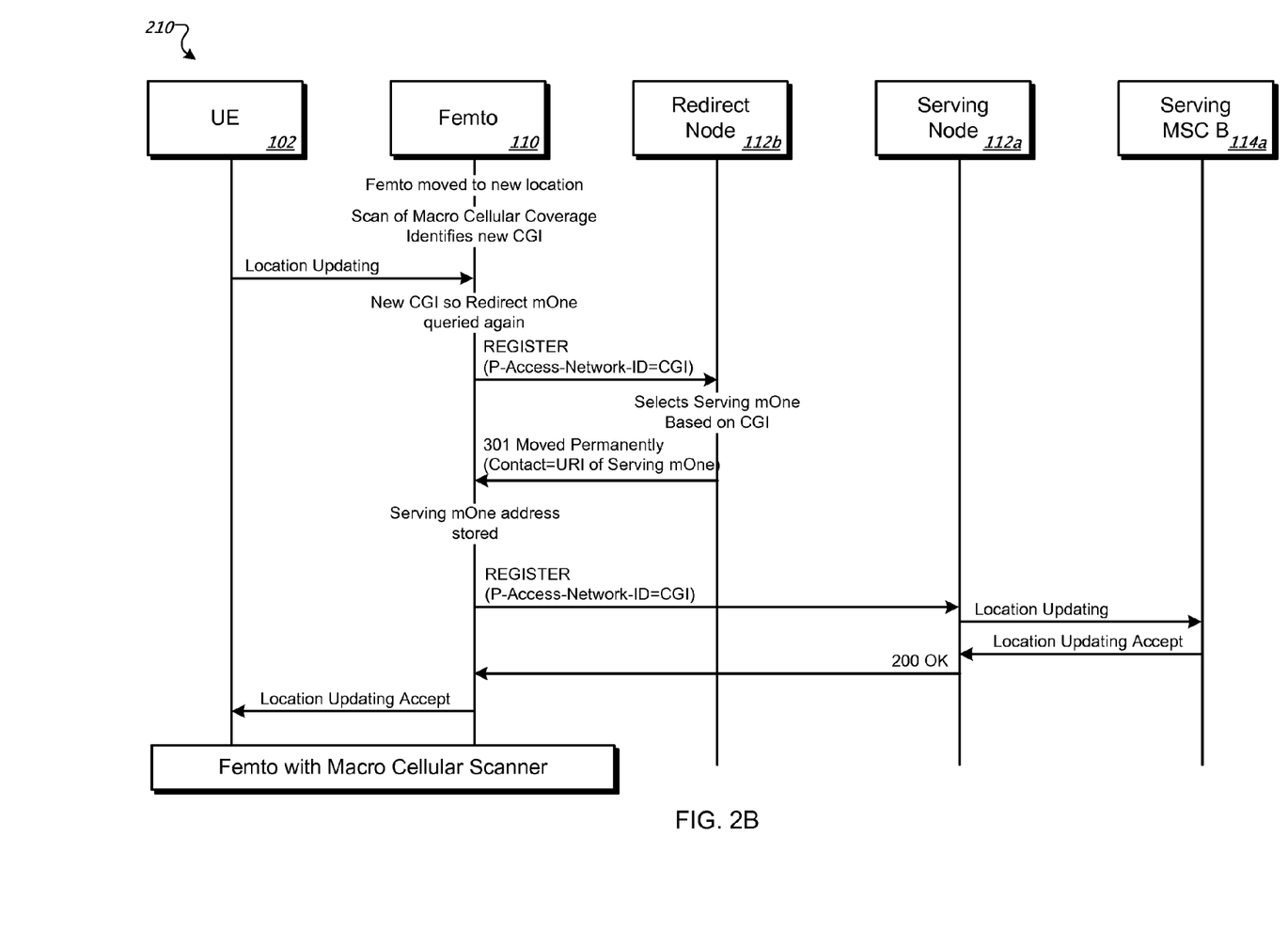
Figure 2C:
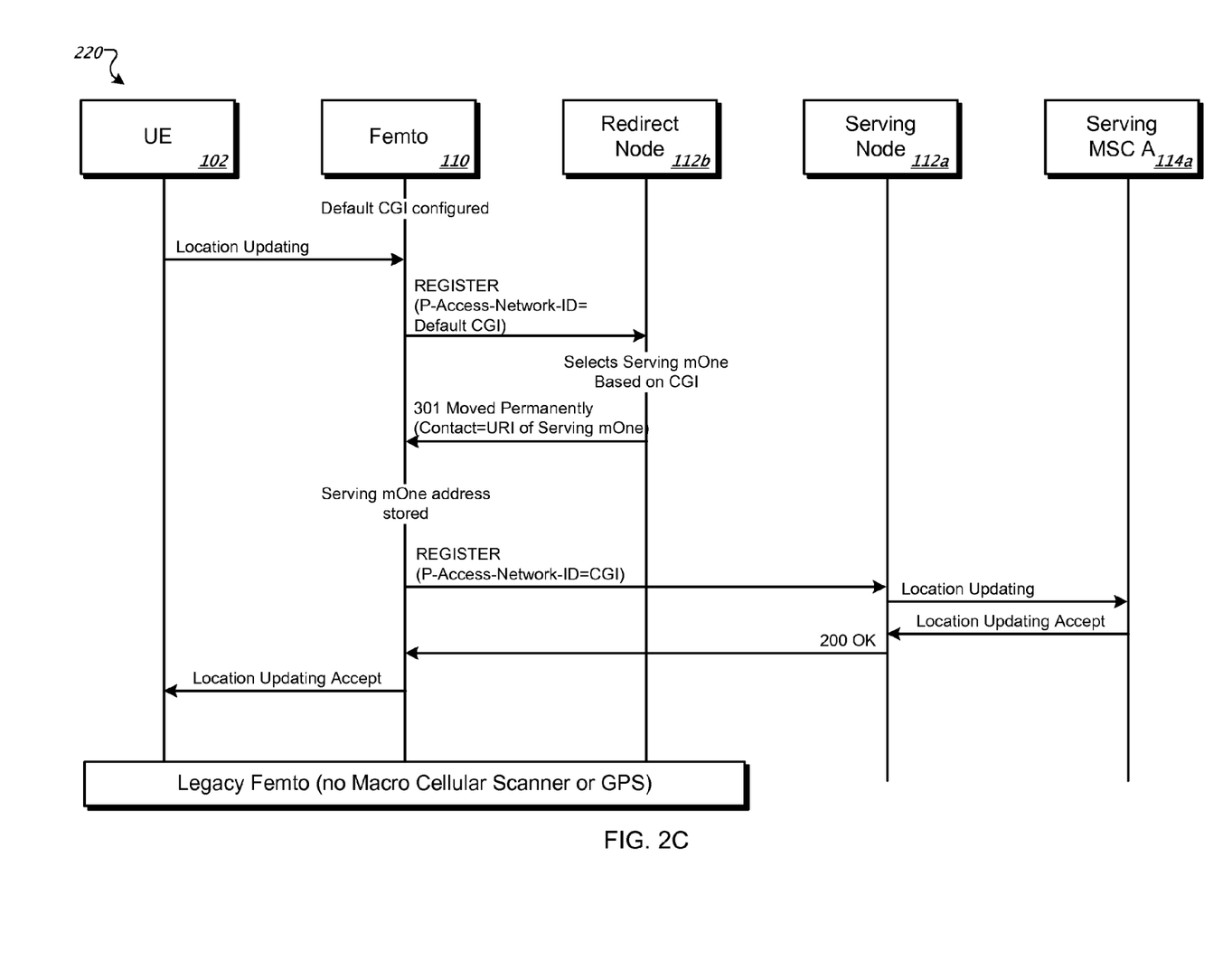
Figure 2D:
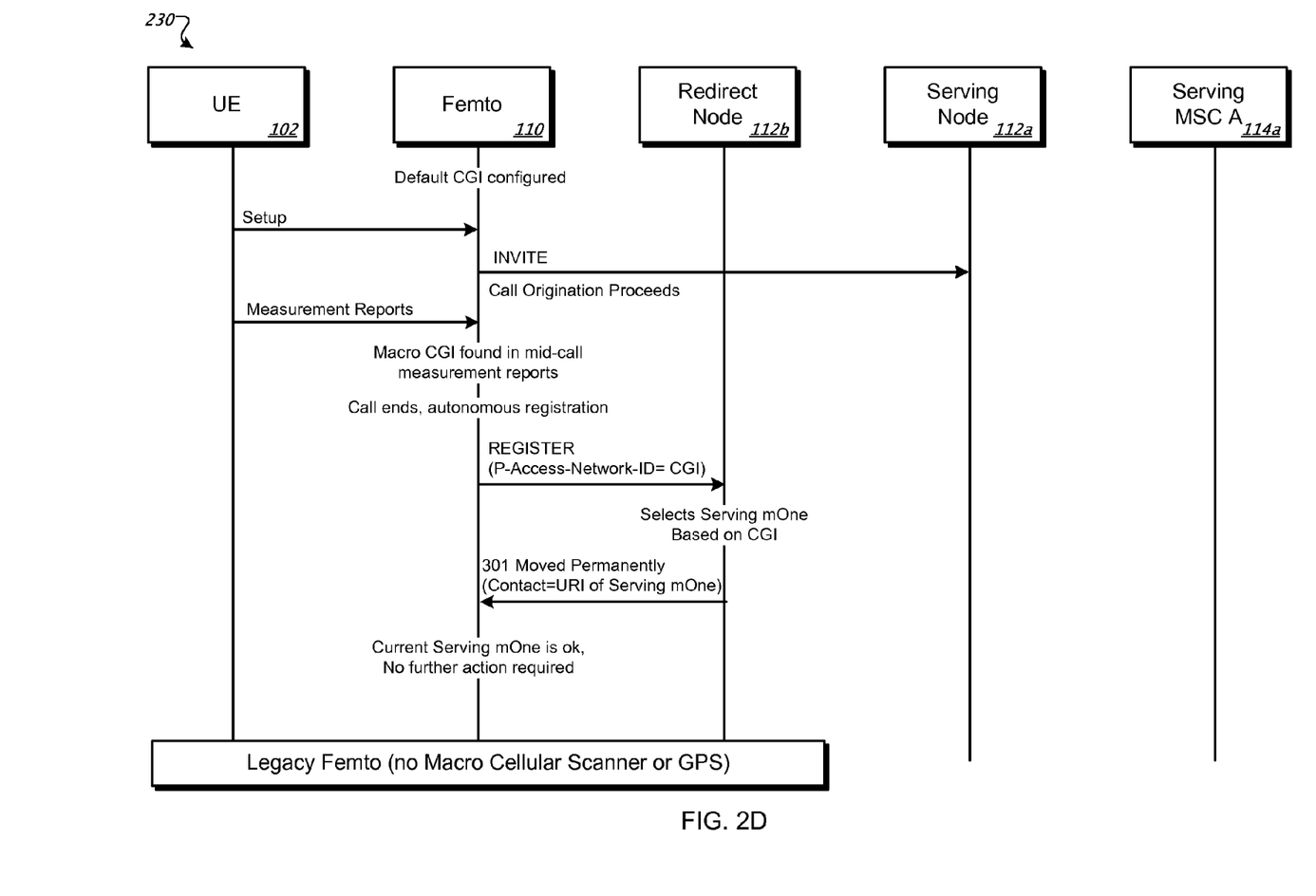
Figure 2E:
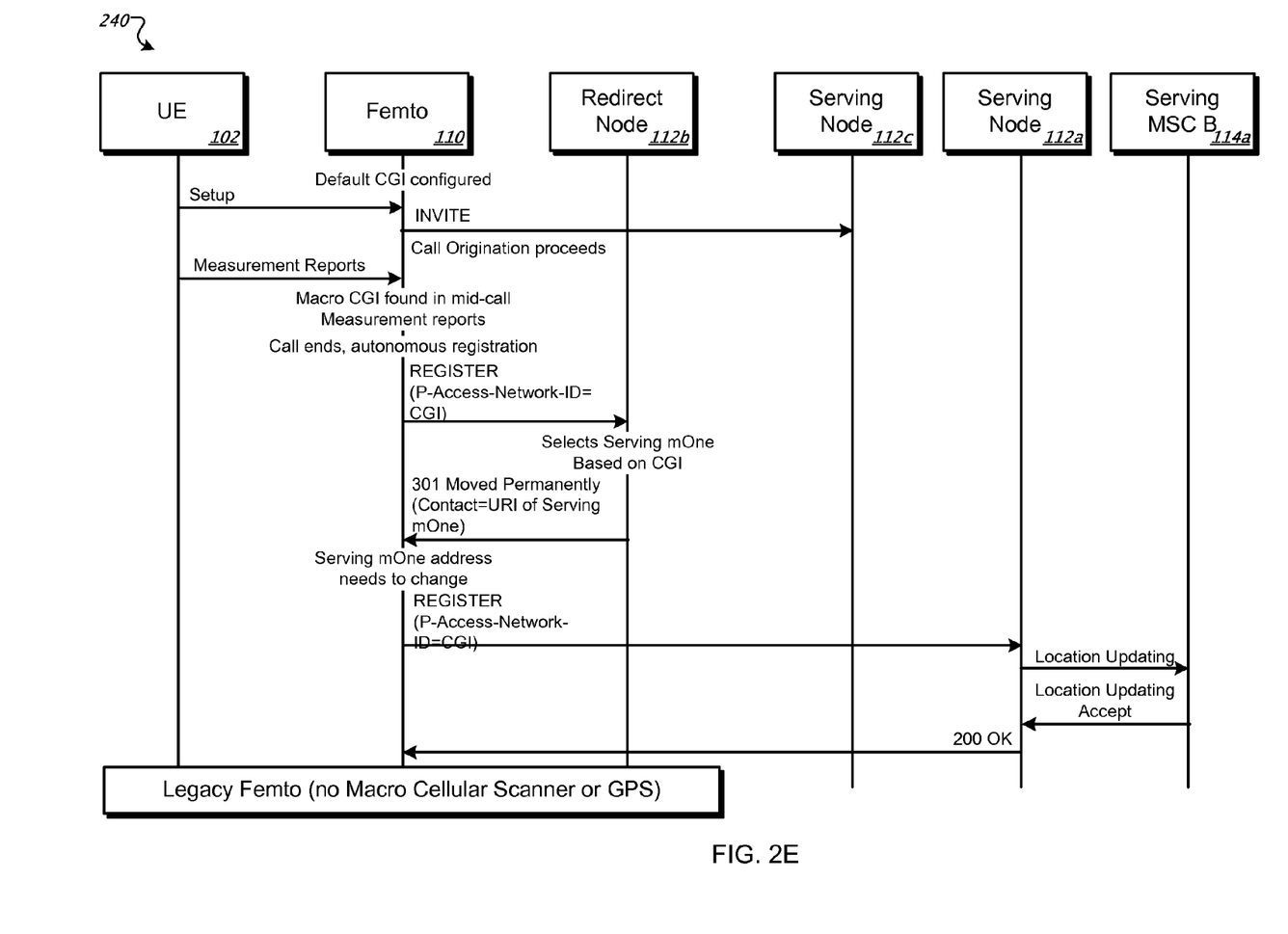

FIG. 1 is an example communication system 100 for managing the discovery of femtocell devices in accordance with some implementations of the present disclosure. In general, femtocell devices include devices that enable cellular radio technologies to initiate and participate in communications sessions through an Internet Protocol (IP) network. Femtocell devices are associated with geographic locations, i.e., femtocells, where the device can wirelessly communicate with cellular devices using cellular radio technologies. In some implementations, the femtocells include a range of 100 meters (m) to 200 m and transmit at a power less than or equal to 1 Watt (W). Cellular radio technologies include Global System for Mobile Communication (GSM) protocols, Code Division Multiple Access (CDMA) protocols, Universal Mobile Telecommunications System (UMTS), and/or any other suitable protocol for formatting data for cellular communication. For example, a UMTS device may participate in a communication session through an IP network using a femtocell device. In some implementations, the system 100 discovers or otherwise identifies a femtocell device registered with one mobile-core-network element associated with a first geographic location and redirects the femtocell devices to register with a different mobile-core-network element associated with a different geographic location. For example, a mobile core network may manage a radio access network (RAN) that covers a geographic location, i.e., macrocell, that is proximate or overlaps a femtocell where the femtocell device is registered with a mobile core network associated with a different macrocell. In this example, the system 100 may identify the updated location of the femtocell device and redirect the femtocell device to register with a mobile core network associated with the updated location. In this case, the system 100 may identify the femtocell device and redirect the femtocell to register with the proximate mobile core network. In some implementations, the mobile core network may authorize or deny wireless communication of the femtocell device in the associated geographic location. In directing the femtocell device to update registration, the system 100 may eliminate, minimize, or otherwise reduce access to cellular radio technology using a femtocell device in an unauthorized geographic region. In other words, the system 100 may reduce the use, by unauthorized users, of cellular radio technology licensed in a geographic region. For example, the femtocell device may only be authorized to operate in Los Angeles, so the system 100 may prevent the femtocell device from operating in Beijing.

At a high level, the system 100, in some implementations, includes cellular devices 102a and 102b, mobile core networks 104a and 104b, RANs 106a and 106b, IP network 108, femtocell device 110, and communication nodes 112a-c. Each mobile device 102 comprises an electronic device operable to receive and transmit wireless communication with system 100. As used in this disclosure, mobile devices 102 are intended to encompass cellular phones, data phones, pagers, portable computers, smart phones, personal data assistants (PDAs), one or more processors within these or other devices, or any other suitable processing devices capable of communicating information using cellular radio technology. In the illustrated implementation, mobile devices 102 are able to transmit in one or more cellular band. In this case, messages transmitted and/or received by mobile device 102 may be based on a cellular radio technology. There may be any number of mobile devices 102 communicably coupled to RANs 106 and/or femtocell device 110. Generally, the mobile devices 102 may transmit voice, video, multimedia, text, web content or any other user/client-specific content. In short, devices 102 generate requests, responses or otherwise communicates with mobile core networks 104 through RANs 106 and/or IP network 108.

Mobile core networks 104a and 104b typically includes various switching elements and gateways for providing cellular services. Mobile core network 104 often provides these services via a number of RANs, such as RAN 106a, and also interfaces the cellular system with other communication systems such as Public Switch Telephone Network (PSTN) via mobile switching center (MSC) 114. In accordance with the GSM standard, mobile core network 104 includes a circuit switched (or voice switching) portion for processing voice calls and a packet switched (or data switching) portion for supporting data transfers such as, for example, e-mail messages and web browsing. The circuit switched portion includes MSC 114 that switches or connects telephone calls between RAN 106 and other networks (e.g., PSTN). The packet-switched portion, also known as General Packet Radio Service (GPRS), includes a Serving GPRS Support Node (SGSN) (not illustrated), similar to MSC 114, for serving and tracking mobile devices 102, and a Gateway GPRS Support Node (GGSN) (not illustrated) for establishing connections between packet-switched networks and mobile devices 102. The SGSN may also contain subscriber data useful for establishing and handing over call connections. Mobile core network 104 may also include a home location register (HLR) for maintaining "permanent" subscriber data and a visitor location register (VLR) (and/or a SGSN) for "temporarily" maintaining subscriber data retrieved from the HLR and up-to-date information on the location of mobile devices 102. In addition, mobile core network 104 may include Authentication, Authorization, and Accounting (AAA) that performs the role of authenticating, authorizing, and accounting for devices 102 operable to access mobile core network 104.

RAN 106 provides a radio interface between mobile devices 102 and mobile core network 104 that may provide real-time voice, data, and multimedia services (e.g., a call) to mobile devices 102. In general, RANs 106 communicates air frames via radio frequency (RF) links. In particular, RAN 106 converts between air frames to physical link based messages for transmission through mobile core network 104. RAN 106 may implement, for example, one of the following wireless interface standards during transmission: IS-54 (TDMA), Advanced Mobile Phone Service (AMPS), GSM standards, CDMA, Time Division Multiple Access (TDMA), General Packet Radio Service (GPRS), ENHANCED DATA rates for Global EVOLUTION (EDGE), UMTS, WiMax, or proprietary radio interfaces.

RAN 106 may include Base Stations (BS) 116 connected to Base Station Controllers (BSC) 118. BS 116 receives and transmits air frames within a geographic region of RAN 106 called a macrocell 120 and communicates with mobile devices 102 in the macrocell 120. Each BSC 118 is associated with one or more BS 116 and controls the associated BS 116. For example, BSC 118 may provide functions such as handover, cell configuration data, control of RF power levels or any other suitable functions for managing radio resource and routing signals to and from BS 116. MSC 114 handles access to BSC 118 and communication node 112, which may appear as a BSC 118 to MSC 114. In some implementations, the communication node 112 may appear as another MSC to MSC 114. MSC 114 may be connected to BSC 118 through a standard interface such as the A-interface. In the case the node is represented as a MSC, the MSC 114 may connect to the node 112 through a standard radio technology interface such as an A or IuCS interface.

Network 108 facilitates wireline communication between femtocell device 110 and any other computer. As described, network 108 communicates IP packets to transfer voice, video, data, and other suitable information between network addresses. In communication sessions, network 108 can use the Session Initiation Protocol (SIP) to set up, route, and tear down sessions. Network 108 may include one or more local area networks (LANs), metropolitan area networks (MANs), wide area networks (WANs), all or a portion of the global computer network known as the Internet, and/or any other communication system or systems at one or more locations. In the illustrated implementation, IP network 108 includes SIP proxy servers for routing SIP messages. Each SIP proxy server can be any software, hardware, and/or firmware operable to route SIP messages to other SIP proxies, gateways, SIP phones, femtocell device 110, nodes 112a-c, and others. In some implementations, the SIP messages may encapsulate at least a portion of radio cellular technology and, as a result, the encapsulation can be transparent to standard SIP Proxy servers. In some cases, the radio cellular technology messages may encapsulated as a Multipurpose Internet Mail Extension (MIME). The standard SIP proxy servers may only act on the standard SIP headers for routing/forwarding decisions of the SIP message and ignore encapsulations in the message body content header.

The femtocell device 110 can include any software, hardware, and/or firmware operable to wirelessly communicate, within a femtocell 111, with mobile devices 102 using cellular radio technology and translate, map or otherwise convert between cellular messages and SIP messages. For example, the femtocell device 110 may convert between SIP and UMTS or GSM messages. In some implementations, the SIP messages based on the cellular messages may be routed through the IP network 108 using standard SIP processing. In some implementations, the femtocell device 110 may generate SIP messages and transmits the SIP messages to the communication node 112 via IP network 108 thereby tunneling radio cellular technology over the IP network 108. In addition, the femtocell device 110 may receive from the communication node 112 a SIP message encapsulating a cellular message and reconstruct the cellular message based, at least in part, on the SIP message. The femtocell device 110 may generate the SIP messages in response to a discovery process, a call session request received from mobile devices 102, and/or any other suitable event. In regards to a discovery process, the femtocell device 110 may include a default setting for a communication node 112 in the network 108 and/or be registered with a communication node 112 associated with a different mobile core network 104. In either case, the femtocell device 110 can transmit location information to the current communication node 112. For example, the femtocell device 110 may be configured to identify a macrocell that are at least proximate the femtocell. In this example, the femocell device 110 may identify a Cell Global Identifier (CGI) associated with the macrocell 120 and transmit the CGI to the default node 112. In some implementations, the femtocell device 110 includes a receiver or is otherwise configured to identify macrocells that are at least proximate the associated femto cell. In this case, the femtocell device 110 can identify location information associated with the femtocell device 110. In some implementations, the femtocell device 110 may identify location information based, at least in part, on measurement reports received from cellular devices 102. The femtocell 120 may receive a request to update registration with a communication node 112 associated with the macrocell 120. In response to at least the request, the femtocell device 120 may transmit a registration request to the identified communication node 112. In the event that the registration request fails or is denied, the femtocell 120 may block cellular call sessions with mobile devices 102.

As mentioned above, the femtocell device 120, in some implementations, transmits messages to communication nodes 112 using SIP. In doing so, the femtocell device 110 may perform two functions when generating the SIP message: (1) encapsulating at least a portion of the cellular message; and/or (2) translating parameters of the cellular message to associated SIP headers. In the case of reconstructing the cellular message, the femtocell device 110 may unencapsulate the portion of the cellular message and translate parameters from SIP parameters to cellular-radio-technology parameters. In regards to encapsulation, the femtocell device 110 may encapsulate a portion of the cellular message in an extension of a conventional SIP message (e.g., INVITE). For example, the femtocell device 110 may add a MIME to a standard SIP message with appropriate MIME headers. In some implementations, the femtocell device 110 encapsulates a GSM/UMTS Non-Access Stratum (NAS)/Layer 3 message in a MIME body of a SIP message. In some implementations, the femtocell device 110 encapsulates the entire GSM/UMTS Mobility Management (MM), Connection Management (CM), and NAS message in the MIME body. Turning to translation, in forming the headers of the SIP message, the femtocell device 110 may translate, map, or otherwise convert parameters from the cellular message to appropriate SIP parameters. For example, the femtocell device 110 map a NAS SETUP message [Called Party BCD Number parameter] to a SIP INVITE request [Request-URI and To header]. In addition, the femtocell device 110 may also converts SIP messages to cellular messages for transmission to cellular devices 102. In particular, the femtocell device 110 may unencapsulate the cellular message from the SIP extension. Also, the femtocell device 110 may translate or otherwise map SIP parameters such as headers to one or more cellular-radio-technology parameters. After the femtocell device 110 generates the cellular message, the femtocell device 110 wirelessly transmits the message to the mobile device 102b.

Communication node 112 may, in one implementation, emulate or otherwise represent itself as a BSC 118 or other network element of mobile core network 104 (e.g., MSC). Thus, the communication node 112 may be queried by MSC's in core network 104 like any other BSC 118. In a particular implementation, the communication node 112 may include a database, or access to a database, of femto devices 110 and/or associated mobile devices 102 or other suitable endpoints or other devices to which the communication node 112 may establish a communication session and/or forward voice or other media. Thus, the femto device 110 may be registered with the communication node 112. In addition, the communication node 112 may be configured to translate between SIP and radio cellular technologies (e.g., GSM, UMTS, CDMA). In some implementations, the communication node 112 may have an A+/IuCS+ or an A interface. To provide some of the features and functions of the cellular services across IP network 108, the communication node 112 may create sub-dialogues within the main SIP dialog in order to map the cellular-radio-technology state machine (e.g., GSM/UMTS DTAP/Layer3 state machine) to the SIP state machine. In addition, the communication node 112 may be configured to map location information to communication nodes 112 associated with the geographic region. For example, the communication node 112 may receive update location information and map the location information to a communication node 112 associated with the region. In this case, the communication node 112 may transmit a request to update registration with the identified communication node.

In one aspect of operation, the femtocell device 110 transmits a registration request to a communication node 112 in response to at least a location update. The femtocell device 110 may identify location information based on transmission from a macrocell, measurement reports from cellular devices 102, GPS, or other processes. In the case that the femtocell device 110 is previously registered, the femtocell device 110 transmits an update request to the communication node 112c. The node 112c maps the location information to a mobile core network 104a associated with the location information and transmits a request to register with the identified mobile core network 104a. The femtocell device 110 transmits a registration request to a communication node 112a associated with the identified mobile core network 104a. Based, at least in part, on information included in the request, the node 112a determines whether the femtocell device 110 is authorized to operate within the geographic region. The node 112a may transmit a response indicating that the femtocell device 110 is not authorized to operate, and in response to at least the rejection, the femtocell device 110 prevents wirelessly communication within the location. In the case the femtocell device 110 is authorized, the femtocell device 110 wirelessly communicates with cellular devices 102 using cellular radio technology.

FIGS. 2A to 2E illustrate example call flows for discovering femtocell devices 110 in system 100 of FIG. 1. The call flows 200 and 210 illustrate the discovery process of the femtocell device 110 where the femtocell device 110 identifies location information (e.g., CGI) from a macrocell associated with the geographic location. The call flow 220 illustrates a discovery process where the femtocell device 100 is not configured to detect location information from the macrocell. The call flows 230 and 240 illustrate discovery processes where the location information is identified based, at least in part, on location information included in measurement reports transmitted by cellular devices 102.

Figure 3:
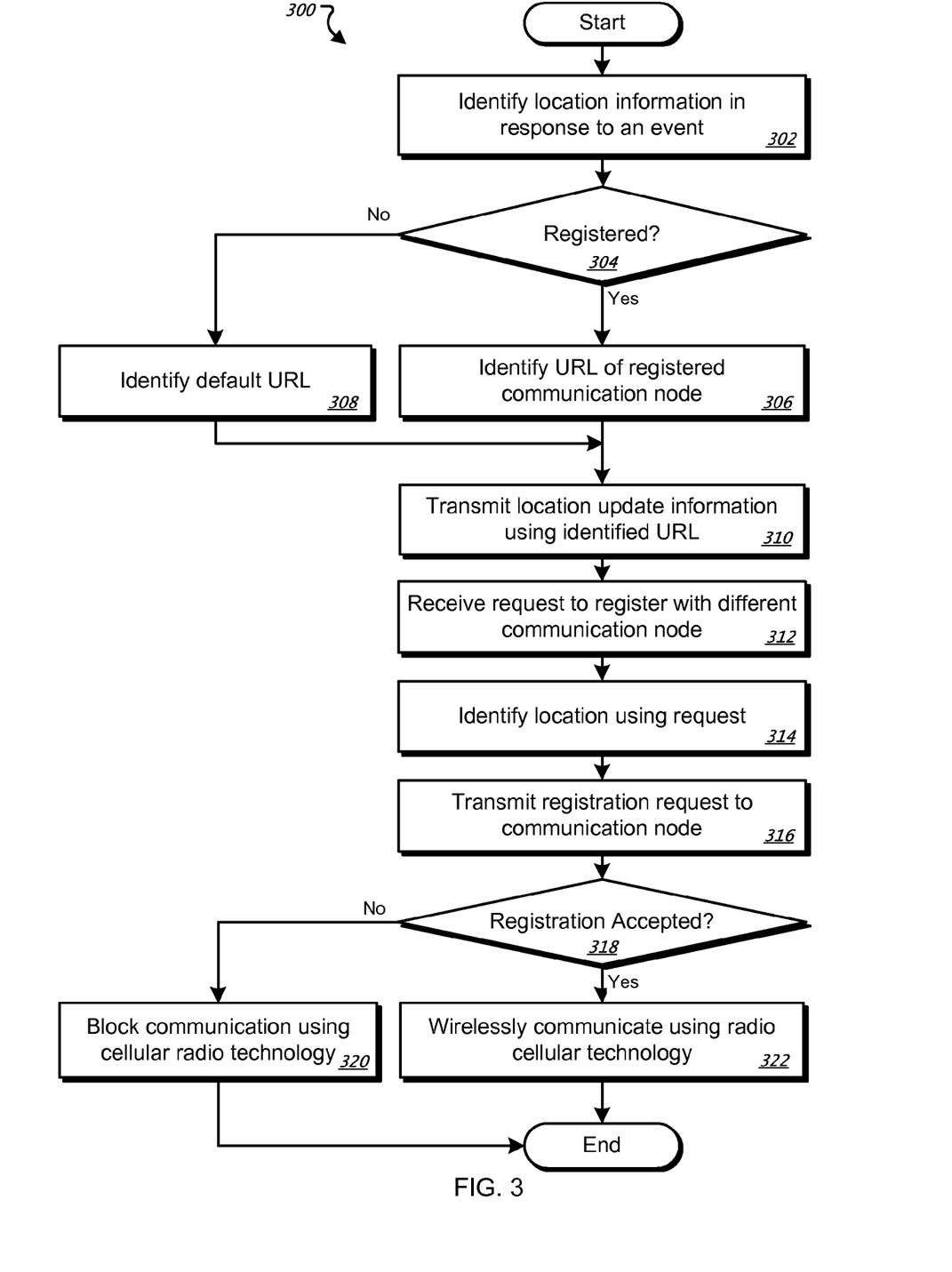
FIG. 3 is a flow chart illustrating an example method for discovering femtocell devices in the system of FIG. 1.

FIG. 3 is a flow chart illustrating an example method 300 for executing a discovery process for femtocell devices in accordance with some implementations of the present disclosure. The illustrated method is described with respect to system 100 of FIG. 1, but this method could be used by any other suitable system. Moreover, system 100 may use any other suitable techniques for performing these tasks. Thus, many of the steps in this flowchart may take place simultaneously and/or in different orders as shown. System 100 may also use methods with additional steps, fewer steps, and/or different steps, so long as the methods remain appropriate.

The method 300 begins at step 302 where location information of a femtocell is identified in response to an event. For example, the femtocell device 110 may identify location information from transmissions of a macrocell in the geographic location or a measure report received from a cellular device 102 within the femtocell. The event may include a message to initiate a call in system 100, activating the femtocell device 110, a location update, and/or others. If the femtocell device is registered at decisional step 304, a URL associated with the registered communication node is identified. For example, the femtocell device 110 may have previously registered with the communication node 112c and an associated UR1 is identified. If the femtocell device is not registered at decisional step 304, then a URL associated with a URL of a default communication node is identified at step 308. For example, the femtocell device 110 may include a URL for the default communication node 112b. Next, at step 310, the femtocell device transmits updated location information to the communication node using the updated location information. As for the example, the femtocell device 110, in some implementations, may transmit the location information to the identified communication node 112. The location information may include a CGI. In response to at least the updated location information, a request to register with a communication associated with the geographic location is received at step 312. Again in the example, the communication node 112 may identify a different communication node 112 associated with the updated location information at step 314 and transmit a request to the femtocell device 110 to register with the different communication node 112 at step 316. Based, at least in part, on the update request, the femtocell device identifies the location of the communication node and transmits a request to register with the cellular core network associated with the geographic location. In the example, the femtocell 110 may transmit a request to the communication node 112a to register with the mobile core network 104a. If the registration request is rejected at decisional step 318, the femtocell device blocks or otherwise prevents communication with cellular devices using cellular radio technology. In the example, the femtocell device 110 receives a registration rejection from mobile core network 104a. If the registration request is accepted at decisional step 318, the femtocell device wirelessly communicates with cellular devices using cellular radio technology. As for the example, the femtocell device 110 authorizes wireless communication within the femtocell using cellular radio technology.

A number of implementations of the invention have been described. Nevertheless, it will be understood that various modifications may be made without departing from the spirit and scope of the invention.

What is claimed is:

1. A method for managing network elements, comprising:
wirelessly receiving, by a femtocell device, information from User Equipment indicating a location of the femtocell device;
determining the femtocell device is registered with a first cellular core network operating in a first geographic area, wherein the femtocell device registers with the first cellular core network using a first network node in an Internet Protocol (IP) connected to the first cellular core network;
transmitting, through an Internet Protocol (IP) network, a location update to the first network node connected to the first cellular core network;
receiving, from the first network node, a response requesting that the femtocell device register with a second cellular core network different from the first cellular core network, the second cellular core network operating in a second geographic area the femtocell device location and different from the first geographic area;
transmitting a registration request to a second network node in the IP network connected to the second cellular core network;
receiving a reply including information from the second network node indicating that the femtocell device is prohibited from operating in the second geographic area; and
prohibiting, by the femtocell device, wireless communication with mobile devices in response to at least the reply from the second network node.

2. The method of claim 1, further comprising receiving transmissions from a macrocell associated with the second cellular core network, wherein the transmissions identify the location of the femtocell device.

3. The method of claim 2, wherein the location comprises a Cell Global Identify (CGI).

4. The method of claim 1, further comprising receiving a measurement report from a cellular device proximate the femtocell device, wherein the measurement report includes the location of the femtocell device.

5. The method of claim 1, wherein the location information includes Global Positioning System (GPS) information.

6. The method of claim 1, wherein the first cellular core network comprises a default cellular core network that registered the femtocell device.

7. The method of claim 1, further comprising receiving authorization to wirelessly communicate with cellular devices within a femtocell using cellular radio technology.

8. A femtocell device, comprising:
one or more processors configured to:
wirelessly receive, by the femtocell device, information from User Equipment indicating a location of the femtocell device;
determine the femtocell device is registered with a first cellular core network operating in a first geographic area, wherein the femtocell device registers with the first cellular core network using a first network node in an Internet Protocol (IP) connected to the first cellular core network;
transmit, through an Internet Protocol (IP) network, a location update to the first network node connected to the first cellular core network;
receive, from the first network node, a response requesting that the femtocell device register with a second cellular core network different from the first cellular core network, the second cellular core network operating in a second geographic area the femtocell device location and different from the first geographic area;
receive a reply including information from a second network node indicating that the femtocell device is prohibited from operating in the second geographic area; and
prohibit, by the femtocell device, wireless communication with mobile devices in response to at least the reply from the second network node.

9. The femtocell device of claim 8, the one or more processors further configured to receive transmissions from a macrocell associated with the second cellular core network, the transmissions identify the location of the femtocell device.

10. The femtocell device of claim 9, wherein the location comprises a Cell Global Identify (CGI).

11. The femtocell device of claim 8, the one or more processors further configured to receive a measurement report from a cellular device proximate the femtocell device, wherein the measurement report includes the location of the femtocell device.

12. The femtocell device of claim 8, wherein the location information includes Global Positioning System (GPS) information.

13. The femtocell device of claim 8, wherein the one or more processors configured to identify the first cellular core network comprises the one or more processors configured to identify a default cellular core network associated with the femtocell device.

14. The femtocell device of claim 8, the one or more processors further configured to receive authorization to wirelessly communicate with cellular devices within a femtocell using cellular radio technology.

15. A system for managing network elements, comprising:
a means for wirelessly receiving, by a femtocell device, information from User Equipment indicating a location of the femtocell device;
a means for determining the femtocell device is registered with a first cellular core network operating in a first geographic area, wherein the femtocell device registers with the first cellular core network using a first network node in an Internet Protocol (IP) connected to the first cellular core network;
a means for transmitting, through an Internet Protocol (IP) network, a location update to the first network node connected to the first cellular core network;
a means for receiving, from the first network node, a response requesting that the femtocell device register with a second cellular core network different from the first cellular core network, the second cellular core network operating in a second geographic area the femtocell device location and different from the first geographic area;
a means for transmitting a registration request to a second network node in the IP network connected to the second cellular core networks;
a means for receiving a reply including information from the second network node indicating that the femtocell device is prohibited from operating in the second geographic area; and
a means for prohibiting, by the femtocell device, wireless communication with mobile devices in response to at least the reply from the second network node.

* * * * *